Oct. 17, 1939.  C. CAYA  2,176,204

BRAKE SHOE EQUALIZING AND CENTERING DEVICE

Filed Oct. 26, 1937  2 Sheets-Sheet 1

Carl Caya
INVENTOR.

BY Robert W. Fulwider
ATTORNEYS.

Oct. 17, 1939.                C. CAYA                    2,176,204
            BRAKE SHOE EQUALIZING AND CENTERING DEVICE
                  Filed Oct. 26, 1937         2 Sheets-Sheet 2

Carl Caya
INVENTOR.
BY Robert W Fulwider
ATTORNEY.

Patented Oct. 17, 1939

2,176,204

UNITED STATES PATENT OFFICE 2,176,204

BRAKE SHOE EQUALIZING AND CENTERING DEVICE

Carl Caya, Santa Monica, Calif.

Application October 26, 1937, Serial No. 171,078

9 Claims. (Cl. 188—78)

My invention relates to brakes, and its objects are to equalize the pressure exerted by the shoes against the drum, regardless of the drum speed or direction of rotation, and to keep the shoe assembly automatically centered regardless of uneven brake linings.

I have accomplished in my invention, by a simple and workable manner, a device to overcome the uneven shoe pressure resulting from the wrapping action of the shoes contacting the rotating drum. This device will act equally well for forward or reverse drum motion and is applicable to the servo or inertia applied brake as well as to other types.

Other advantages of my invention will be understood from the following description and drawings.

Fig. 5 is a vertical section just inside the brake drum and is a similar view to that of Fig. 1.

Fig. 6 is a partial section through line 6—6 of Fig. 5 and shows the lateral movement, frictional holding, and shoe centering details.

Figure 1:
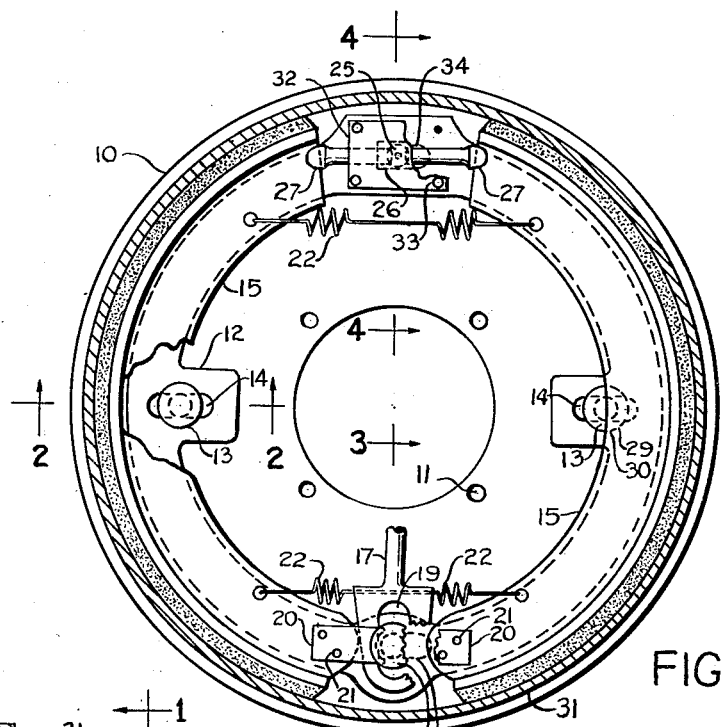
Fig. 1 is a vertical section just inside the brake drum as shown by section line 1—1 in Figs. 3 and 4.
Figure 4:
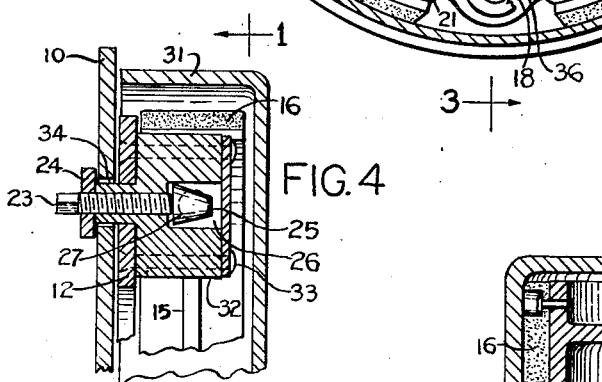
Fig. 4 is a partial section through line 4—4 of Fig. 1 and shows the part details between shoe ends for take up and servo action.

Referring by numeral reference to the various parts in the illustrations 10 is a brake back plate which attaches through holes 11 to a stationary axle, or housing if the axle should be rotative. A floating semi-back plate 12 is slidingly connected to the main back plate 10 by two diametrically opposite anchor bolts 13. Slots 14 allows the semi-back plate 12 to move in a transverse direction which is normal to the symmetrical plane between the shoe ends.

Brake shoe take up, and spreading means hereinafter described are of known construction and may be any of several known types such as would be exemplified by using hydraulic spreading means instead of mechanical, as shown.

Brake shoes 15 to which are attached the linings 16 are spread by a downward motion of a wedge 17. An anchor bolt 18 slidingly guides the wedge 17 by means of a slot 19 which allows horizontal play as well as vertical motion in wedge 17. Motion of the wedge 17 is restricted in an axial direction by its being held between four arms 20 which may be attached on each side of the shoes 15 by suitable fastenings, such as the rivets 21. The arms 20 also act to position lower ends of the shoes 15 by seating against the anchor bolt 18 during the released brake position. Lower ends of the shoes 15 contact the wedge 17 which shifts against the anchor bolt 18 to transmit brake torque to the semi-back plate 12. Springs 22 act to return the brake shoes 15 to their released position.

Brake take up may be accomplished by adjustment means such as a stud 23 which carries a lock nut 24. The stud 23 bears against a cone frustrum 25 which is held in a chamber 26. Movement of the cone frustrum 25 in a lateral direction is allowed by the chamber 26, and shoe-connecting links 27 bear against the cone frustrum 25 which is frictionally held against the stud 23 by action of the spring 22. This contact positions the upper ends of the shoes 15 with respect to the semi-back plate 12. The connecting links 27 are slidingly mounted in block 32 which allows transmission of brake torque between shoes and constitutes self-energized shoe action. The shoes 15 slidingly bear against forked ends of the connecting links 27 and remain in contact as a result of pressure from the spring 22.

Figure 2:
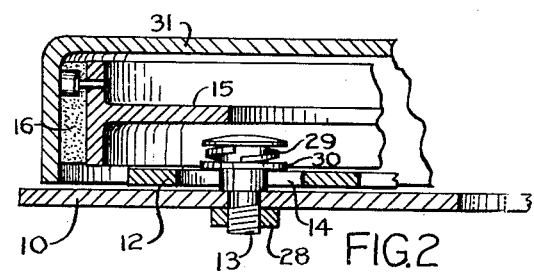
Fig. 2 is a partial section through line 2—2 of Fig. 1 and shows the details of parts for lateral movement and brake shoe assembly centering.
Figure 3:
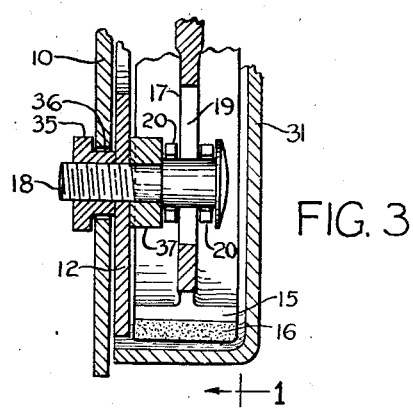
Fig. 3 is a partial section through line 3—3 of Fig. 1 and shows the part details between the two shoe ends where the shoes are spread and anchored.

As shown in Fig. 2, the anchor bolts 13 may be securely held to the back plate 10 by means such as the nuts 28. Frictional means such as a spring washer 29 and a plain washer 30 slidingly hold the semi-back plate 12 against the regular back plate 10. When the brake is applied, this frictional-holding force, being less than the force resulting from balancing the shoe contacts against the drum, will resistingly allow the semi-back plate 12 to shift in a lateral direction and seek a position in which it is in equilibrium with one shoe balanced against the other. Upon release, the brake shoes 15 and the semi-back plate 12 which have been automatically centered, remain in this position due to the holding action of the frictional contacting parts mentioned.

As a constructional arrangement, a take up block 32, which may be fastened to the semi-back plate 12 by suitable means such as rivets 33, carries a boss that protrudes through a slot 34 in the back plate 10. The lock nut 24 which is tightened against this boss, and bears against the back plate 10, restricts axial motion of the semi-back plate assembly, and acts as a brace in that direction. This arrangement leaves the semi-back plate 12 freedom to shift as allowed by the slots 34 and 36 and the anchor slots 14. As a similar constructional arrangement, a shouldered nut 35 works through the slot 36 in the back plate 10 to fasten the anchor bolt 18 and a spacer 37.

Figure 5:
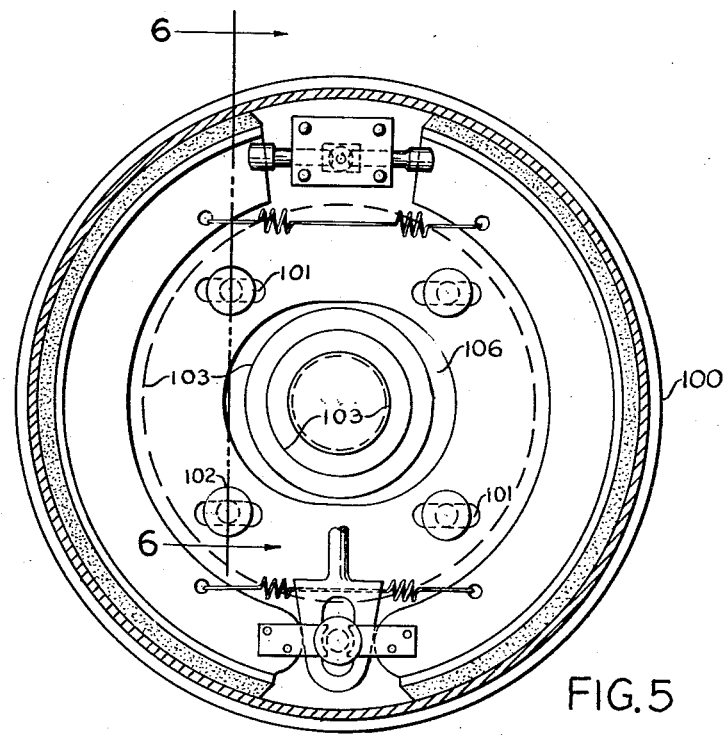
Figs. 5 and 6 show a modified form of construction, for accomplishing the same result as that given by the construction in Figs. 1 to 4, inclusive.
Figure 6:
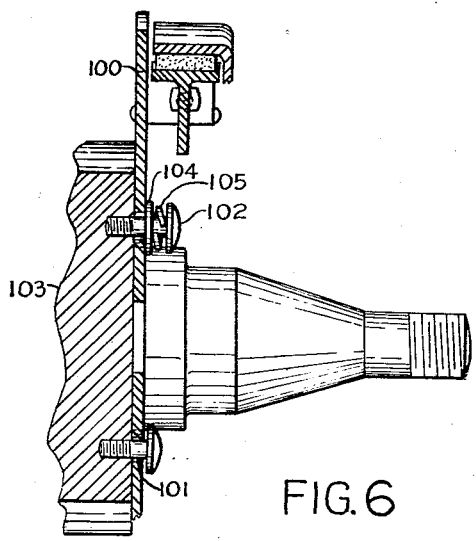

In Figs. 5 and 6, I show a modified form of construction that utilizes the principles of my invention. A back plate 100 carries elongated horizontal slots 101. The brake shoe assembly is attached to the back plate 100 and is allowed transverse movement by the slots 101 and the clearance slot 106. Anchor bolts 102 pass through the slots 101 and anchor to an axle 103 which is arbitrarily shown as stationary. For a rotative axle, anchorage would be made to the axle housing. The brake shoe assembly is held centered by means such as frictional-holding washers 104 and 105 which act the same as the previously described washers 29 and 30 in Fig. 2. The lower anchor bolt 102 slidingly holds the back plate 100, and restricts its axial motion. The cross direction of the slots 101 prevents rotative movement of the back plate 100.

The particular embodiments I have used to illustrate my invention are used for example only and various changes may be made therein without departing from the spirit and scope of my invention.

I claim as my invention:

1. In combination, a brake drum, frictional brake means engageable therewith carried by a plate, a relatively stationary member, and means for mounting said plate upon said member whereby limited substantially straight-line motion is allowed between said plate and said member.

2. A device as set forth in claim 1 which includes a yielding frictional element for damping motion between said plate and said member.

3. In combination, a brake drum, a plate associated therewith, frictional brake means anchored on said plate, means mounted on said plate for expanding said friction means to cause it to engage said drum, a member relatively stationary with respect to said plate and said drum, and means for mounting said plate upon said member whereby a limited essentially straight-line movement is allowed between said plate and said member.

4. A device as set forth in claim 3 which includes a yielding frictional element for damping motion between said plate and said member.

5. A device as set forth in claim 3 in which said brake means is self-energizing.

6. A device as set forth in claim 3 in which the movement of said plate with respect to said member is restricted to a direction normal to the line joining the anchoring means and the drum center.

7. A device as set forth in claim 3 in which said plate is provided with a plurality of slots and said means for mounting it upon said member comprises a plurality of bolts adapted to engage said slots.

8. In combination, a brake drum, a plate associated therewith provided with a plurality of slots whose major axes are generally in a horizontal plane, a plurality of brake shoes anchored on said plate, means mounted on said plate for expanding said shoes to cause them to engage said drum, a relatively stationary member provided with a plurality of bolts adapted to engage said slots whereby said plate is mounted upon said member for limited essentially straight-line motion, and yielding frictional means for damping said motion between said plate and said member.

9. A device as set forth in claim 8 in which said brake means is self-energizing.

CARL CAYA.